C. ROBINSON.
Cigar-Holders.
No. 222,841. Patented Dec. 23, 1879.
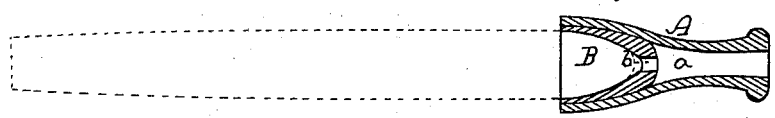
Fig. 1.
   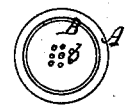
Fig. 2.   Fig. 3.
WITNESSES
INVENTOR,
Charles Robinson,
By J. S. Brown,
his ATTORNEY.

UNITED STATES PATENT OFFICE.

CHARLES ROBINSON, OF CAMBRIDGEPORT, MASSACHUSETTS.

IMPROVEMENT IN CIGAR-HOLDERS.

Specification forming part of Letters Patent No. 222,841, dated December 23, 1879; application filed September 18, 1879.

*To all whom it may concern:*

Be it known that I, CHARLES ROBINSON, of Cambridgeport, in the county of Middlesex and State of Massachusetts, have invented an Improved Cigar-Holder; and I do hereby declare that the following is a full and exact description thereof, reference being had to the accompanying drawings, making part of this specification.

Figure 1 is a central longitudinal section of the improved cigar-holder; Fig. 2, a front end view of the same; Fig. 3, a view similar to that of Fig. 2, but showing a slight modification of the construction.

Like letters designate corresponding parts in all of the figures.

Heretofore caps or mouth-pieces for cigars have been made of soft india-rubber; but although such caps would be desirable on account of their softness to the lips and teeth of the smoker, and protecting the end of the cigar from wetting and unfolding, if they were effectual for the purpose, yet they have failed to fulfill such a purpose, because of their freely allowing the entrance of the saliva around the cigar, and because they have not sufficient firmness and rigidity to hold the cigar in form or to sustain the cigar outside of the mouth.

The object of my invention is to obtain the advantages of a soft-rubber mouth-piece, as above indicated, and also of a rigid mouth-piece, and to avoid the objections to the latter in their discomfort to the lips and teeth. At the same time I obtain the additional advantage in providing a chamber or vestibule for preventing the flow of saliva from the mouth into the holder in contact with the cigar.

My invention consists in the combination of an interior cigar cap or holder and an exterior soft cap or shield to be held in the mouth, the latter forming an outer chamber in connection with the former, for the purposes hereinafter specified.

In the drawings, A represents the outer cap or shield to be held in the mouth. This I make of soft india-rubber, preferably pure gum. This being soft and yielding is exceedingly easy and pleasant to hold in the mouth. Although elastic it is made sufficiently thick to retain its form and not bend to the weight of the cigar.

Any equivalent soft elastic material not unpleasant to the taste may be used; but I know of no material for the purpose so good as the pure soft india-rubber.

The inner cap or holder B is preferably made of wood turned in the proper shape, but hard rubber or equivalent and suitable material may be employed. It should have sufficient rigidity and firmness to retain its form, hold the cigar securely, and keep the outer cap or shield, A, in form and properly extended. It has the proper interior form to hold the end of a cigar by friction, as indicated in Fig. 1, where a cigar is indicated by dotted lines. It has an aperture, $b$, opening from its interior cavity back into the outer cap or shield, A, as shown in Figs. 1 and 2; or there may be several very small apertures, as shown in Fig. 3, to divide and cool the smoke, and prevent its impinging upon the interior of the mouth in a forcible stream.

The outer cap, A, fits and is retained around the inner cap, B, as shown, or otherwise suitably united with it. The rear part, $a$, of its interior outside or back of the cap B forms a separate chamber, into which the smoke is first drawn, distributed, and cooled before it enters the mouth. This chamber also arrests the inward flow of saliva from the mouth, and prevents its reaching in to the cigar and wetting it.

The holder may be, of course, made of the proper size for cigarettes as well as cigars.

Not only has this construction of the cigar-holder the advantages over a simple soft rubber cap of furnishing a separate chamber, $a$, into which the smoke first enters, and is partially cooled before reaching the mouth of the smoker, and which arrests the saliva, so as not to reach the cigar itself, but it furnishes a real cigar-holder capable of holding the cigar entirely out of the mouth, and allowing it to be smoked up more completely, and it does not allow the end of the cigar to get out of shape.

What I claim as my invention, and desire to secure by Letters Patent, is—

A cigar-holder composed of an outer cap or shield, A, of soft india-rubber, and an inner cap or holder, B, substantially as and for the purpose herein specified.

The foregoing specification signed by me this 17th day of September, 1879.

CHARLES ROBINSON.

Witnesses:
DAVID H. COOLIDGE,
C. C. MORGAN.